Feb. 8, 1966 R. W. CREAMER 3,233,485

AUTOMATIC PUNCH PRESS

Original Filed Dec. 6, 1961 10 Sheets-Sheet 1

INVENTOR.
R. W. Creamer

BY
William S. Dorman

ATTORNEY

Feb. 8, 1966 R. W. CREAMER 3,233,485

AUTOMATIC PUNCH PRESS

Original Filed Dec. 6, 1961 10 Sheets-Sheet 2

INVENTOR.
R. W. Creamer

BY William S. Dorman

ATTORNEY

Feb. 8, 1966 R. W. CREAMER 3,233,485

AUTOMATIC PUNCH PRESS

Original Filed Dec. 6, 1961 10 Sheets-Sheet 3

INVENTOR.
R. W. Creamer

BY
William S. Dorman

ATTORNEY

Feb. 8, 1966 R. W. CREAMER 3,233,485

AUTOMATIC PUNCH PRESS

Original Filed Dec. 6, 1961 10 Sheets-Sheet 4

INVENTOR.
R. W. Creamer
BY
William S. Dorman
ATTORNEY

Feb. 8, 1966 R. W. CREAMER 3,233,485

AUTOMATIC PUNCH PRESS

Original Filed Dec. 6, 1961 10 Sheets-Sheet 5

INVENTOR.
R. W. Creamer
BY
William S. Dorman
ATTORNEY

Feb. 8, 1966 R. W. CREAMER 3,233,485

AUTOMATIC PUNCH PRESS

Original Filed Dec. 6, 1961 10 Sheets-Sheet 6

INVENTOR.
R. W. Creamer

BY

ATTORNEY

Feb. 8, 1966 R. W. CREAMER 3,233,485

AUTOMATIC PUNCH PRESS

Original Filed Dec. 6, 1961 10 Sheets-Sheet 7

INVENTOR.
R. W. Creamer
BY
William D. [signature]
ATTORNEY

INVENTOR.
R. W. Creamer
BY

ATTORNEY

INVENTOR.
R. W. Creamer
BY
William S. Dorman
ATTORNEY

Feb. 8, 1966 R. W. CREAMER 3,233,485

AUTOMATIC PUNCH PRESS

Original Filed Dec. 6, 1961 10 Sheets-Sheet 10

INVENTOR.
R. W. Creamer
BY
William S. Doman
ATTORNEY

United States Patent Office 3,233,485
Patented Feb. 8, 1966

3,233,485
AUTOMATIC PUNCH PRESS

Robert W. Creamer, Fort Worth, Tex., assignor, by mesne assignments, to Numeric Systems of Texas, Inc., Fort Worth, Tex., a corporation of Texas Original application Dec. 6, 1961, Ser. No. 157,416. Divided and this application July 31, 1964, Ser. No. 392,986
9 Claims. (Cl. 83—71)

This invention relates to improvements in punch press apparatus and more particularly, but not by way of limitation, to an automatic punch press particularly designed and constructed for automatically selecting the spacing or dimensioning of apertures to be punched in a structural member, or work piece, and punching the apertures in accordance with a predetermined pattern or arrangement.

This application is a division of my co-pending application Serial No. 157,416, filed December 6, 1961.

It is common practice in the construction industry, and particularly the steel construction industry, to bolt or rivet mating structural members together for forming the framework of a building, bridge or the like. The usual procedure is to punch or otherwise form holes in the structural members for receiving the bolts or rivets prior to the actual riveting or bolting operation. Of course, the holes provided in mating elements must be in substantial alignment in order that the riveting operation may be accomplished in an efficient manner. At present, prior to the punching of the structural elements, and particularly work pieces of such shapes as angles, I-beams, H-beams, channels, or flat stock, the dimensioning or locating of the holes is usually done manually by measuring from a known or given base line or reference point and marking the work piece at the positions to be punched. It will be readily apparent that such a procedure is not only slow, but inefficient due to inherent manual or human errors.

The present invention contemplates a novel automatic punching apparatus wherein the selecting or positioning of the holes to be punched in a piece of stock or work piece is entirely automatic, thus eliminating the human errors as well as greatly decreasing the over-all punching time. Of course, it is to be noted that the work piece may be of substantially any desired type, as hereinbefore set forth, and it is anticipated that many working operations may be accomplished on the work piece in this novel automatic manner, such as welding thereof, bending, scoring, cutting, drilling perforating or the like, in addition to or in lieu of the punching of holes. For the purposes of illustration, the punching of holes will be set forth in detail herein, it being understood that this in no manner limits the scope of the invention to this particular work operation.

The selection or the positioning of the holes is preferably controlled by a perforated tape member which may be remotely disposed from the punch press machine. The control tape may be prepared in accordance with the desired pattern or arrangement of apertures or holes for the piece of stock, and is utilized for energizing the electrical circuits of the apparatus for moving the stock through the punch press and automatically punching the holes required therein in one over-all operation. The control tape regulates the longitudinal movement of the piece of stock through the machine and controls the stoppage thereof in a plurality of predetermined positions for being punched. The punching apparatus is controlled or positioned with respect to the work piece in accordance with the desired gage of the hole, or distance of the hole from a given reference position, and then actuated for punching of the work piece. Upon the punching of the hole, the stock is automatically advanced through the machine for being punched at the next succeeding position. The sequence of operations is such that substantially any desired pattern of holes or apertures may be punched on the work piece in accordance with the programming of the control tape. Of course, the invention is not limited to a control by a tape, but may be electrically controlled in any suitable manner, such as by a photoelectric cell apparatus, or the like, if desired.

For example, in the punching of a plurality of holes in predetermined patterns on an angle member, the angle member may be disposed on the machine in such a manner that the two legs thereof extend upwardly at approximately forty-five degree angles. A punch machine is provided for each leg of the angle member, and the control tape actuates the apparatus for moving the angle through the machine into a predetermined position with respect to the punching members. The punch press members are slidably mounted for movement toward and away from the heel of the angle member, and upon response to the control tape, the press members for each leg of the angle member are moved toward the respective leg member, either alternately or simultaneously, a sufficient distance to provide the desired gage for the hole to be punched. The gage dimension is usually considered to be the distance from the heel of the angle to the center line of the hole. After the positioning of the punch press with respect to the legs of the angle member, the punch mechanism is actuated for the punching of the hole. In the event two holes are to be punched in the same line, but at different gages, the second punching operation is completed prior to any longitudinal movement of the angle member through the machine. The angle may then be moved longitudinally through the apparatus in response to the signals of the control tape and is positioned for the next succeeding punching operation.

The entire operation of punching and moving the work piece through the machine is completely automatic in response to the program or pattern set up on the control tape. It has been found that great numbers of holes may be punched in relatively short periods of time. In addition, it is possible to punch work piece after work piece with great accuracy whereby mating structural elements may be efficiently bolted or riveted together. Thus, the novel automatic punching apparatus not only greatly reduces the time required for the punching of the holes in a structural member, but also greatly increases the accuracy of the punching operation and facilitates the final assembly operation of the punched elements.

It is an important object of this invention to provide a novel punch press apparatus for automatically selecting the positioning of holes for a work piece and punching the element in one over-all operation.

It is another object of this invention to provide a novel automatic punch press apparatus for punching holes in a work piece in response to the signals of a control means remote from the punch press machine.

Another object of this invention is to provide a novel automatic punch press apparatus actuated by a control means which may be programmed for punching a plurality of holes in a structural element in accordance with substantially any predetermined pattern.

A further object of this invention is to provide a novel automatic punch press apparatus wherein a plurality of structural elements may be quickly and efficiently punched with substantially an identical pattern for facilitating the final assembly of the punched elements.

Still another object of this invention is to provide a novel automatic punch press apparatus particularly designed and constructed for selecting the location of holes in both the longitudinal and transverse directions for punching thereof in a work piece.

A still further object of this invention is to provide a novel automatic punch press apparatus wherein the locating and punching of a plurality of holes in a structural element may be accomplished with great speed and accuracy.

It is still another object of this invention to provide an automatic punch press apparatus for punching holes in a plurality of structural elements whereby each structural element is automatically moved through the apparatus for being punched and released from the apparatus upon the completion of the punching operation.

It is a still further object of this invention to provide an automatic punch press apparatus wherein the punching machines are slidably mounted on the apparatus for punching holes in a structural element at substantially any desired transverse dimension.

A still further object of this invention is to provide an automatic punch press apparatus having a control tape which may be programmed for actuation of the apparatus for punching substantially any desired pattern of holes on a structural element.

Another object of this invention is to provide an automatic punch press apparatus wherein a plurality or pattern of holes may be punched in both legs of an angle beam in one over-all operation.

A further object of this invention is to provide a novel punch press apparatus wherein a plurality of punching machines are provided for punching a plurality of leg members of a work piece during one passage of the work piece through the apparatus.

It is a still further object of this invention to provide a novel punch press apparatus having a pair of punching machines slidably mounted for movement at an angle of substantially forty-five degrees for reducing the force required for reciprocating the punch machines.

A still further object of this invention is to provide a novel automatic punch apparatus wherein the punching pattern for a work piece may be altered or readily changed for the punching of a new work piece having a different pattern requirement.

Another object of this invention is to provide a novel automatic punch press apparatus which efficiently and rapidly punches a pattern of holes in a work piece in an automatic manner which greatly reduces the number of workmen required, thus reducing the over-all expense of the operation.

Still another object of this invention is to provide a punch press apparatus having novel indexing means for controlling the advancing of the work piece through the apparatus and for controlling the pattern or arrangement of the holes punched therein.

Other and further objects and advantageous features of the present invention will hereinafter more fully appear in connection with a detailed description of the drawings in which.

Figure 1:
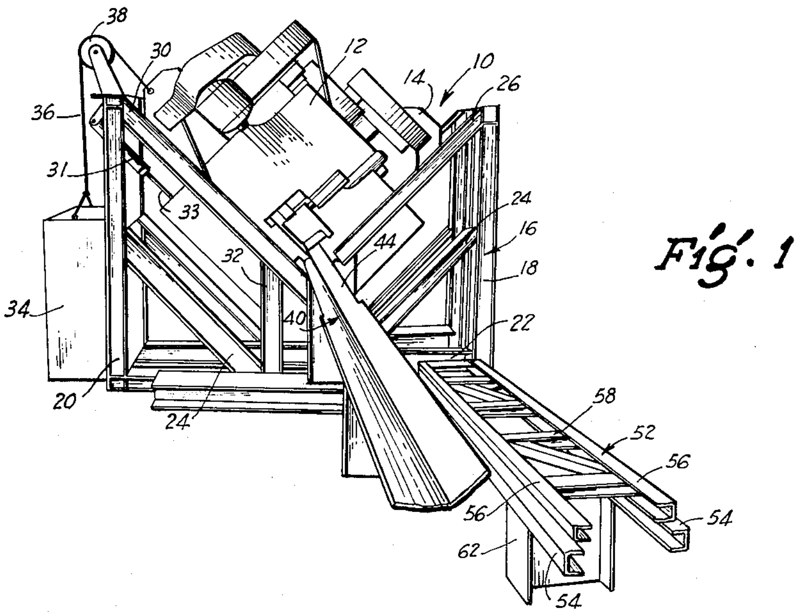
FIGURE 1 is a perspective view of the punch machines and a portion of the rack device of the invention.
Figure 2:
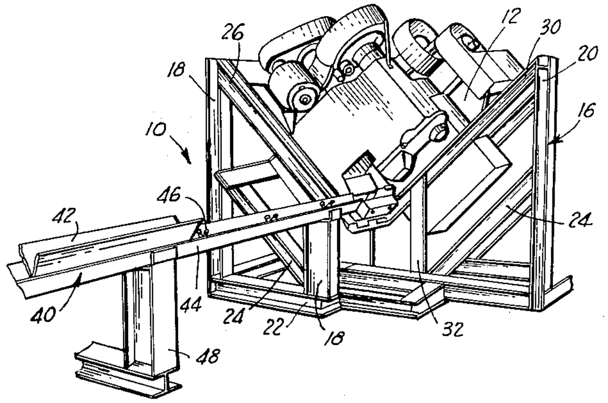
FIGURE 2 is a perspective view of the novel punch press apparatus taken from the opposite side of that depicted in FIGURE 1.
Figure 3:
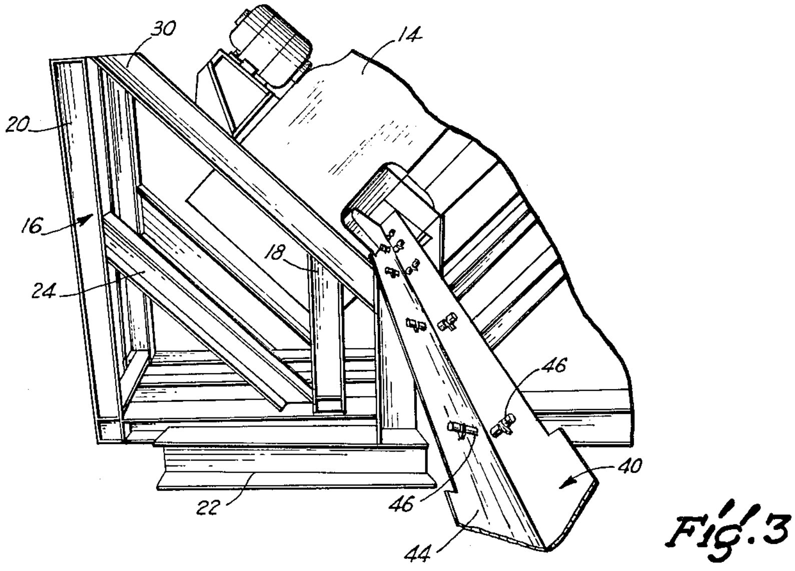
FIGURE 3 is a perspective view of a portion of the punch press apparatus, slightly enlarged, and particularly depicting the work receiving portion thereof.

Referring to the drawings in detail, reference character 10 generally indicates a novel punch press apparatus comprising a plurality of punch press machines 12 and 14, of substantially any well known type, mounted on a suitable framework structure 16. As shown in FIGURES 1 and 2, it is preferable to provide two of the punch press machines, but not limited thereto, and the two machines 12 and 14 are oppositely disposed on the structure 16. The framework 16 preferably comprises a plurality of upright beams or support members 18 spaced from a plurality of similar upright support members 20. A plurality of transverse or horizontal base members 22 provide a base for the upright members 18 and 20, as is well known, and suitable angularly disposed beams or brace members 24 may be provided for rigidity and strength.

A plurality of spaced angularly disposed beam members 26 extend downwardly and outwardly from the upper end of the upright members 18, and are each supported at the opposite end by an upright beam 28, thus providing a railing or track structure for supporting the punch machine 14. A plurality of similar angularly disposed spaced beams 30 extend outwardly and downwardly from the upper end of the upright members 20 and are each supported at the opposite end by an upright beam 32 to provide a track or railing structure for supporting the punch machine 12.

The angular members 26 and 30 are preferably disposed at an angle of substantially forty-five degrees, and the punch machines 12 and 14 are preferably slidably disposed on the respective rail structures 30 and 26 in any well known manner whereby the machines may be reciprocated therealong for a purpose as will be hereinafter set forth. It will be apparent that the two machines 12 and 14 may be mounted on respective vertical and horizontal track structures, if desired. However, as a practical matter, it has been found that the forty-five degree disposition of the railing members 26 and 30 greatly facilitates the reciprocation of the machines 12 and 14 during the punching operation, and requires less force for the movement thereof.

The punch machines 12 and 14 may be reciprocated along the respective rails 30 and 26 in any suitable manner, such as by a pneumatically actuated cylinder 31 (FIGURE 1) having a piston rod 33, or the like, extendible therefrom and suitably connected with the respective punch machine, such as the machine 12. The application of fluid to the cylinder 31 will extend the rod 33 whereby the machine 12 may be moved downwardly along the rails 30. Conversely, the exhausting of fluid from the cylinder 31 will permit the rod 33 to be moved inwardly with respect thereto, or retracted for pulling or moving the machine 12 upwardly on the rails 30. Of course, any suitable means may be utilized for reciprocation of the machines 12 and 14, such as a motor driven ball screw, or the like (not shown). A counterweight member 34 (FIGURE 1) is suspended from the machine 12 by a cable 36 which extends over a pulley 38. A similar counterweight (not shown) is carried by the machine 14, and the counterweights function to maintain the machines 12 and 14 in a normally raised position on the respective track 30 and 26 and facilitates the upward movement of the punch machines thereon. Thus, the machines 12 and 14 are responsive to the application of pressure or force for moving downwardly on the tracks 30 and 26 for completing the punching operation, as will be hereinafter set forth.

A work piece support member, generally indicated at 40 extends through and beyond the framework structure 16 for supporting the work piece, such as the angle member 42, during the punching operation. The work piece support member 40 preferably comprises a substantially horizontally disposed work holder member 44, which is preferably constructed of an angle member positioned in such a manner that the heel thereof is disposed downwardly with the two legs thereof extending upwardly therefrom and each leg at an angle of approximately forty-five degrees. Of course, the work holder or support member 44 may be of any suitable configuration, but as a practical matter, this particular arrangement has proven to be very efficient and universal in application and operation. A plurality of spaced roller members 46 are provided on each leg of the support member 44 for facilitating the movement of the work piece 42 therealong, as is well known. The work holder member 44 is supported above the floor or ground level by suitable spaced leg beams 48. The angled work support member 44 extends for a substantially great distance from the punch press machines 12 and 14, or forwardly and rearwardly thereof, in order that substantially any length work piece 42 may be handled by the apparatus 10.

A movable rack 52 is disposed adjacent or slightly spaced from the work support member 44 and extends substantially parallel thereto forwardly from the machines 12 and 14 for a substantial distance, as clearly indicated in the drawings. The rack 52 is slidably mounted on a pair of spaced substantially horizontally disposed rail members 54 whereby the rack 52 may be reciprocated in alternate directions of toward and away from the punch machines 12 and 14, for a purpose as will be hereinafter set forth. The rack 52 may be of any suitable construction, but preferably comprises a pair of spaced side angle members 56 having a plurality of spaced transverse members 58 secured therebetween. The transverse members 58 are preferably spaced one foot apart for facilitating the control of the forward movement of the rack 52 in accordance with predetermined dimensioning or the programming of the control means, as will be hereinafter set forth. Suitable cross bracing or angularly disposed members 59 may be provided for strength and rigidity, if desired. The rack 52 is moved along the rails 54 by hydraulic means to be hereinafter set forth in detail, and is provided with a suitable hook member (not shown) at the end thereof adjacent the punch press machines 12 and 14 for grasping the work piece 42 whereby the movement of the rack 52 is transmitted thereto for moving the work piece 42 through the apparatus 10 during the punching operation.

Figure 5:
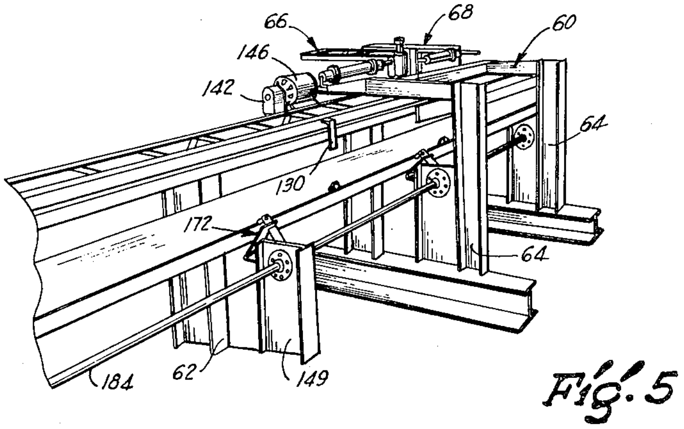
FIGURE 5 is a perspective view of the extreme forward end of the punch press apparatus particularly depicting the forward portion of the track, and the indexing device therefor.
Figure 6:
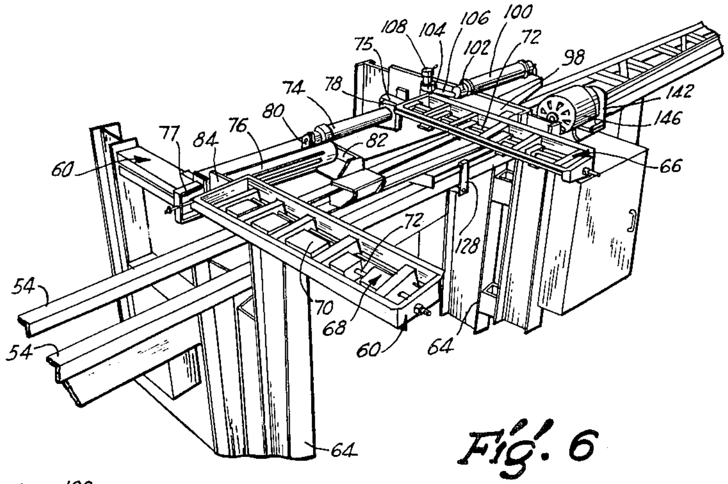
FIGURE 6 is a perspective view of the indexing device for the rack means.
Figure 7:
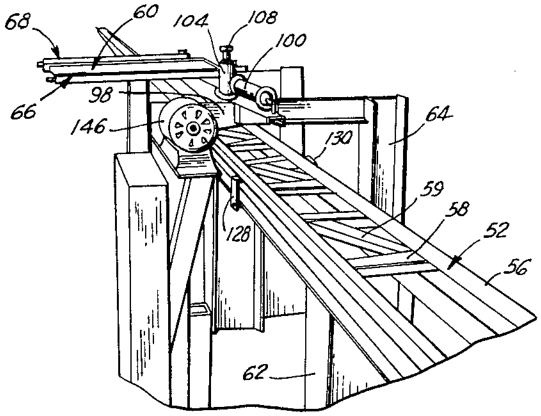
FIGURE 7 is a perspective view of the rack means and indexing device from a different position.

The rails 54 extend forwardly from the punch press machines 12 and 14 throughout a substantial distance and extend through a rack indexing mechanism, generally indicated at 60 (FIGURES 5, 6 and 7). Of course, the rack 52 is somewhat shorter than the overall length of the rails 54 whereby the rack may be moved longitudinally therealong without becoming disengaged therefrom. The rails 54 are supported from the floor or ground level by a plurality of spaced upright leg beams 62 similar to the legs 46 in any well known manner (not shown).

*Indexing mechanism*

The indexing mechanism 60 comprises a pair of spaced frame or support structures 64 which span the rails 54 and support a pair of indexing racks 66 and 68. The indexing racks 66 and 68 are substantially identical and are each provided with a plurality of fluid actuated cylinders 70 for reciprocation of a central longitudinally extending rod 72. An internal piston (not shown) is provided in each of the cylinders 70, and the cylinders 70 are preferably of varying selected lengths whereby the length of travel of the pistons is varied for a purpose as will be hereinafter set forth. The rod member 72 of the indexing rack 66 is suitably connected with an indexing cylinder 74 through a suitable rack and pinion mechanism 75, or the like, for rotation of the cylinder 74. The rod 72 of the indexing rack 68 is similarly connected with a second indexing cylinder 76 through a rack and pinion mechanism 77 for rotation of the cylinder 76.

When a suitable fluid, such as hydraulic fluid or pneumatic fluid, is properly applied or supplied to the indexing mechanism or device 60, the pistons of the cylinders 70 are reciprocated therein in accordance with the pre-selected pattern therefor whereby the rod 72 will be advanced or retracted through a predetermined distance. The movement of the rods 72 actuates the respective rack and gear mechanisms 75 and 77 for rotating the cylinders 74 and 76, respectively, through an arc or angular distance in accordance with the pre-selected pattern. Thus, the degree or amount of rotation of the cylinders 74 and 76 is determined by the desired pattern of holes to be punched in the work piece 42, as will be hereinafter set forth. Normally, each indexing cylinder 74 and 76 is rotated through independent or different angular measures during the operation of the apparatus 10.

The indexing cylinders 74 and 76, as more clearly depicted in FIGURES 11 through 14, are disposed in spaced relation with the longitudinal axes thereof parallel, but off-set with respect to each other. The cylinder 74 is suitably journalled for rotation between a pair of spaced support members 78 and 80, and the cylinder 76 is similarly journalled for rotation between a pair of spaced support members 82 and 84. The cylinder 74 is preferably the fraction-of-an-inch indexing member and is provided with a plurality of indexing bars 86 spaced around the outer periphery thereof. The bars 86 are so disposed that one end 88 of each bar 86 is in substantial alignment with that end of the other bars 86. However, each bar 86 is preferably exactly one-sixteenth of an inch shorter than the preceding bar 86. In this manner, the ends 90 of the bars 86, which extend in a direction toward the adjacent cylinder 76, are disposed in a stair-step arrangement, with each end 90 one-sixteenth of an inch different in length than the two adjacent bars 86.

The cylinder 76 is preferably the inch indexing member, and is provided with a plurality of indexing bars 92 spaced around the outer periphery thereof. One end 94 of each bar 92 is disposed in substantial alignment with the other bars 92, and each bar 92 is preferably exactly one inch shorter than the preceding bar 92. In this manner, the outer ends 96 of the bars 92, which extend in a direction toward the adjacent cylinder 74, are disposed in a stair-stepped arrangement complementary to that of the bars 88, and the outer end 96 of each bar 92 is one inch different in length than the two adjacent bars 92.

Figure 14:
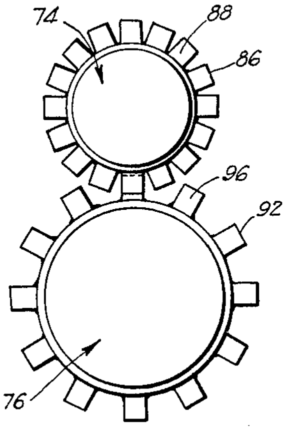
FIGURE 14 is an end elevational view of the indexing of the invention.
Figure 15:
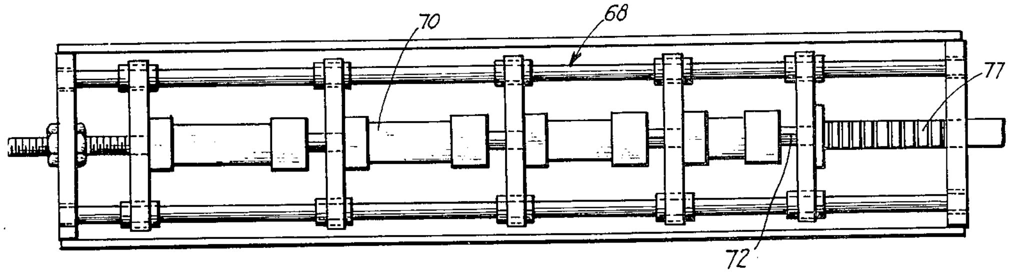
FIGURE 15 is a plan view of the piston or control rack means for the indexing system of the invention.

It will be readily apparent that it is necessary to provide sixteen of the bars 86 around the periphery of the cylinder 74, as shown in FIGURE 14, in order that the increments of one-sixteenth of an inch between the lengths of the bars 86 will equal one inch throughout one complete revolution of the cynder 74. Similarly, it is necessary to provide eleven of the bars 92 around the outer periphery of the cylinder 76 in order that the increments of one inch between the lengths of the bars 92 will total eleven and fifteen-sixteenths inches throughout one complete revolution of the cylinder 76. (Of course, it will be apparent that twelve bars 92 may be so arranged as to provide a total of one foot, if desired.) Thus, when a dimension of one and one-sixteenth of an inch is desired in the movement of the rack member 52 (as will be hereinafter set forth) is desired, the indexing racks 68 and 66 are hydraulically actuated for rotating the cylinders 76 and 74 through the angular measure required for aligning the proper bar 92 with the proper bar 86. The cylinders are then brought together for moving the aligned bars 86 and 92 into abutment in any suitable manner. For example, the cylinder 74 may be slidably mounted in any well known manner, for response to hydraulic pressure for movement in a direction toward the cylinder 76. This abutment of the aligned bars 86 and 92 provides a limit for the forward movement of the rack 52 in accordance with the pre-selected dimension, as will be hereinafter set forth. For purposes of illustration, only one bar 86 and 92 are shown on the respective indexing cylinders 74 and 76 in FIGURE 13 to depict the relative positions therebetween in the abutting relationship.

The cylinder 74 is preferably mounted for slidability as hereinbefore set forth, on a carriage mechanism 98 (FIGURE 6) which is so arranged with respect to the frame members 64 for reciprocation above the rail members 54 in response to the actuation of a hydraulic cylinder 100. The piston 102 of the cylinder 100 is reciprocated therein upon the application of hydraulic, or pneumatic pressure, and is suitably connected with a plunger housing 104 through a link arm member 106, or the like. The plunger housing 104 is carried on the carriage 98 for movement therewith simultaneously with the cylinder 74. A vertically disposed plunger 108 is reciprocally disposed within the housing 104, and upon electrical energization, as will be hereinafter set forth, will snap or move downwardly into the path of the advancing rack 52 for limiting the forward movement thereof. As hereinbefore set forth, the cross members 58 of the rack 52 are disposed one foot apart.

Thus, in order to control the forward movement of the rack 52 in accordance with a predetermined distance, the selected inches and fractions thereof are set or determined by the indexing cylinders 74 and 76 and the plunger housing 104 is carried simultaneously while the cylinder 74 through the selected distance. When the plunger is released, the next succeeding cross member 58 contacts the lowered plunger, and the forward movement of the rack is stopped. Of course, the actuation or dropping of the plunger 108 is timed in accordance with the desired number of feet whereby the rack 52 will have advanced through the desired number of feet prior to the dropping of the plunger. This action is controlled by the electrical circuit, which will be hereinafter set forth in detail. It will be apparent that inwardly directed lug members (not shown) may be spaced at one foot intervals along either side angle 56 of the rack 52 for contacting the lowered plunger 108 in lieu of the cross members 58, if desired.

The cylinders 70 of the indexing racks 66 and 68 are so varied as to provide for variations of travel for the rods 72, as hereinbefore set forth. It has been found that four variable cylinders are adequate for the determination of substantially any desired inch or fraction of an inch to be controlled by the indexing cylinders 74 and 76. One of the cylinders 70 of each indexing rack 66 and 68 is so arranged for advancing the rod 72 sufficiently for turning the respective indexing cylinder through one unit of revolution in accordance with the spacing between the bars on the respective indexing cylinder. Another of the cylinders 70 is so arragned to advance the rod 72 sufficient for rotation of the respective indexing cylinder through two units of revolution. Yet another of the cylinders 70 is so arranged to advance the rod 72 through a sufficient distance to provide for rotation of the respective indexing cylinder through four units of revolution, while the fourth of the cylinders 70 of each indexing rack 66 and 68 is so arranged to advance, or retract the rod 72 sufficiently for rotation of the respective indexing cylinder through eight units of revolution. With the combination of revolution units of one, two, four and eight, any desired total number of revolutions may be provided.

Figure 16:
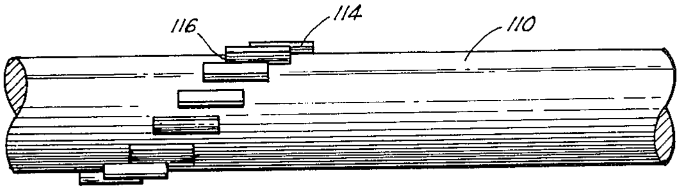
FIGURE 16 is a view similar to FIGURE 11 depicting a modified indexing cylinder for the indexing system.
Figure 17:
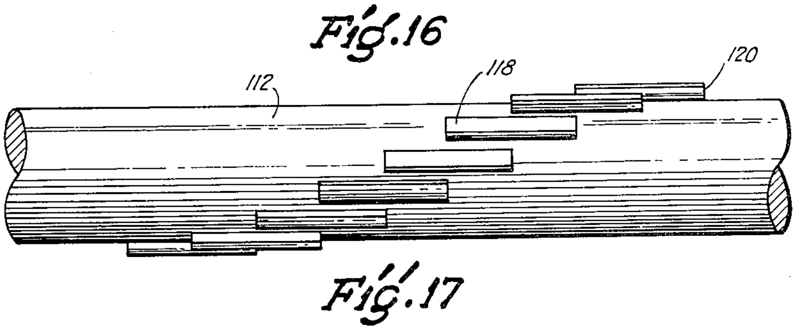
FIGURE 17 is a view similar to FIGURE 12 depicting a modified indexing cylinder for the indexing system.

Modified indexing cylinders 110 and 112 are shown in FIGURES 16 and 17. The indexing cylinder 110 is comparable to the cylinder 74 and may be referred to as the fraction-of-an-inch indexing cylinder. The indexing cylinder 110 is provided with a plurality of indexing bars 114 spaced on the outer periphery thereof. Each indexing bar 114 may be of substantially the same length, and each bar 114 is disposed longitudinally on the cylinder 110 in such a manner that the left end 116 thereof, as viewed in FIGURE 16, is spaced one-sixteenth of an inch from the end 116 of the preceding bar 114. Thus, there will be a differential of one-sixteenth of an inch between the ends 116 of each bar 114 with respect to the adjacent bars 114. As a practical matter, this arrangement of the bars 114 provides a more equally balanced structure as compared with the bars 86 of different or varying lengths provided on the cylinder 74.

The indexing cylinder 112 may be compared with the cylinder 76 and may be referred to as the inch indexing cylinder. The indexing cylinder 112 is of a similar construction to that of the cylinder 110, and is provided with a plurality of circumferentially spaced indexing bars 118 on the outer periphery thereof. The bars 118 are usually longer than the bars 114, and are preferably all of substantially the same length. However, each bar 118 is disposed on the cylinder 112 in such a manner that the right hand end 120 thereof, as viewed in FIGURE 17, is spaced longitudinally one inch from the end 120 of the next preceding bar 118. Thus, there will be a space differential of one inch between each bar 118 and the adjacent bars 118. This structure provides a balanced arrangement for the indexing cylinder 112. In operation, the cylinders 110 and 112 will function in the same manner as hereinbefore set forth.

Figure 18:
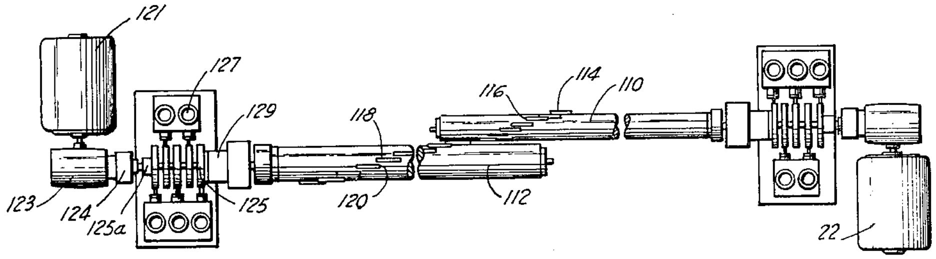
FIGURE 18 is a view similar to FIGURE 13 depicting a modified means for controlling the aligning of the indexing cylinders.

Referring to FIGURE 18, it is to be noted that the indexing cylinders 110 and 112 (or the cylinders 74 and 76, not shown in FIGURE 18) may be actuated or rotated by means of suitable motors 121 and 122, preferably of an identical type. The motors 121 and 122, and the associated elements to be hereinafter set forth, may be utilized in lieu of the indexing racks 66 and 68, and at least one of the motors, such as the motor 122, is to be carried by the movable carriage 98. The motor 121, acting through a suitable gear box 123 and electric clutch 124, drives a plurality of indicating cams 125 and the indexing drum 112 through a concentric drive shaft **125*a*. A plurality of micro-switches 127 are suitably mounted in the proximity of the indicating cams 125** and respond to or read position reports from the indicating cams 125 and transmit a continuous position to the selector panel (not shown) of the control apparatus to be hereinafter described.

An electric brake 129 is mounted concentric with the drive shaft 125*a* and is energized simultaneously with the release of the clutch 124 at such time as the drum or cylinder 112 arrives or is positioned at the pre-selected position therefor. The motor 121 operates continuously, and the starting and stopping of the indexing cylinder 112 is accomplished by use of the clutch 124 and brake 129 only.

During the rotation of the cylinder 112, the brake 129 may be only partially deenergized, preferably approximately seventy percent deenergized. It is desirable that the drive shaft 125*a* be constructed from either brass or stainless steel in order that there will be no magnetic field transmitted from the brake 129 to the clutch 124 when the brake is fully energized and the clutch fully deenergized. This arrangement of elements permits the positioning of the indexing cylinder within extremely accurate tolerances at a speed of approximately eighty-six revolutions per minute, or approximately seven-tenths of a second for a complete revolution. Furthermore, the brake 129 retains the drum or cylinder 112 firmly in its new position until the brake is released.

The motor 122 is similarly connected with the cylinder 110 for rotation thereof, and for purposes of convenience, the like elements are identically numbered herein. Thus, both the cylinders 110 and 112 may be independently rotated in response to signals from the control means. The over-all operation of the cylinders 110 and 112, and the plunger 108 remains substantially the same as hereinbefore set forth in the operation of the cylinders 74 and 76, the only difference being that the clutch 124 and brake 129 are actuated in response to signals from the electric circuit, to be hereinafter set forth, to provide the desired rotation of the cylinders 110 and 112.

*Work piece moving apparatus*

Figures 8, 9, 10:
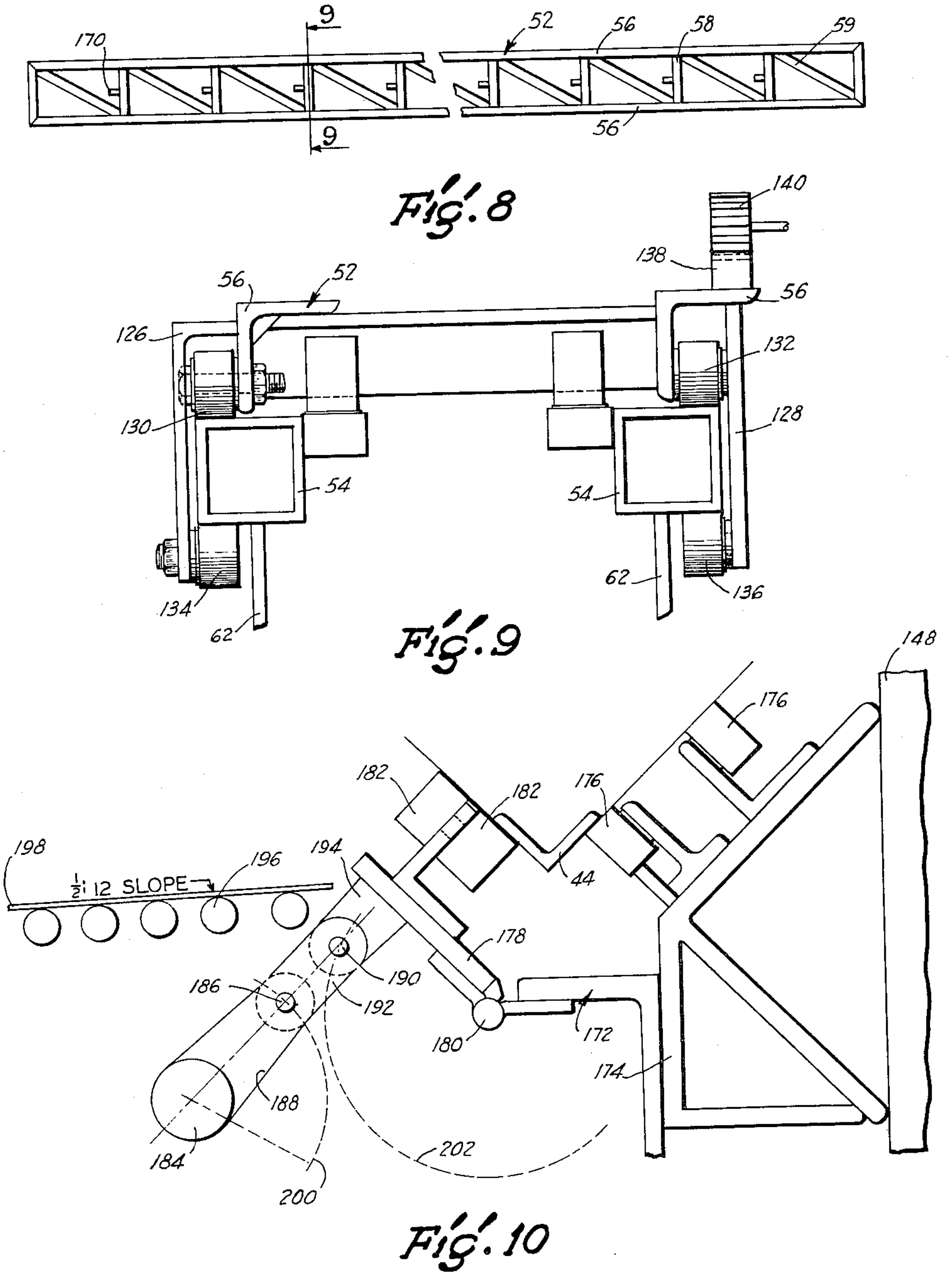
FIGURE 8 is a broken plan view of the rack means of the invention.
FIGURE 9 is a sectional elevational view taken on line 9—9 of FIGURE 8.
FIGURE 10 is a sectional elevational view of the work piece holding portion of the apparatus and depicts the work piece ejection mechanism.
Figure 11:
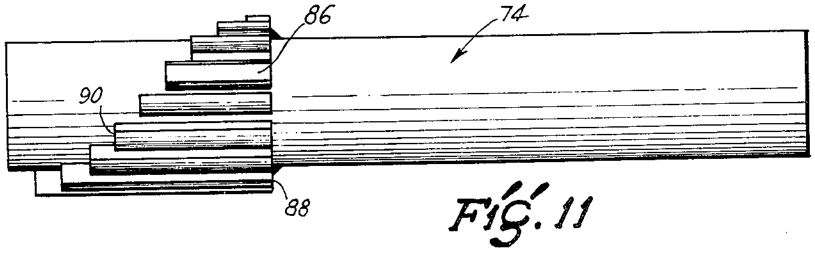
FIGURE 11 is an enlarged side elevational view of an indexing drum or cylinder of the indexing device.
Figure 12:
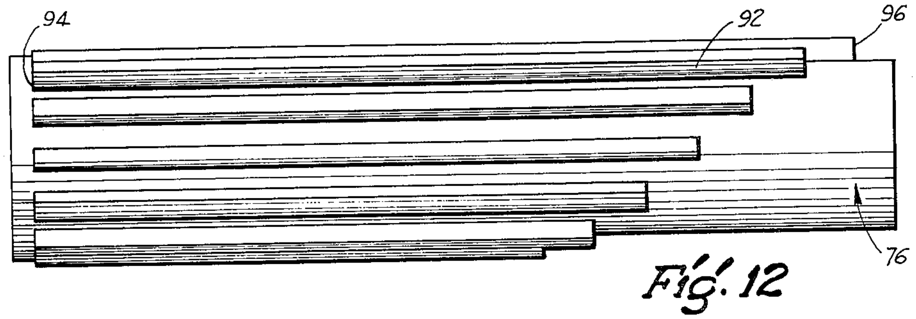
FIGURE 12 is a view similar to FIGURE 11 depicting another indexing cylinder of the indexing device.
Figure 13:
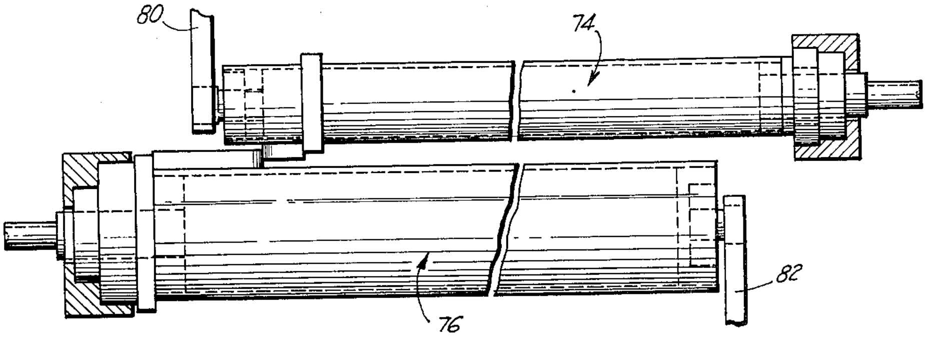
FIGURE 13 is a broken elevational view of the indexing device of the invention with certain portions omitted for purposes of illustration.

Referring now to FIGURES 8 and 9, the rack 52, as hereinbefore set forth, is slidably secured to the rails 54 for reciprocal movement therealong. The rack 52 may be secured to the rails 54 in any suitable manner, and as shown in FIGURE 9, in this instance, the rack 52 is provided with oppositely disposed downwardly extending flange members 126 and 128 rigidly secured to the side angles 56. The flanges 126 and 128 may be disposed at substantially any desired location on the angles 56, and there may be a plurality of the flanges 126 and 128 longitudinally spaced along the angles 56, if desired. A plurality of oppositely disposed roller members 130 and 132 are secured to the side rails 56 in the proximity of the flanges 126 and 128, respectively, and ride on the upper surface of the spaced rail members 54 whereby the rack 52 may roll or move readily along the rails. A plurality of roller members 134 are carried by the flange 126 and are inwardly directed for engaging the under surface of the rail 54 adjacent thereto. A plurality of similar rollers 136 are carried by the flange 128 and are inwardly directed for engaging the under surface of the adjacent rail 54. It will be apparent that the rollers 134 and 136 cooperate with the rollers 130 and 132, respectively, for retaining the rack 52 on the rails 54 and for facilitating the movement of the rack 52 therealong.

Figure 19:
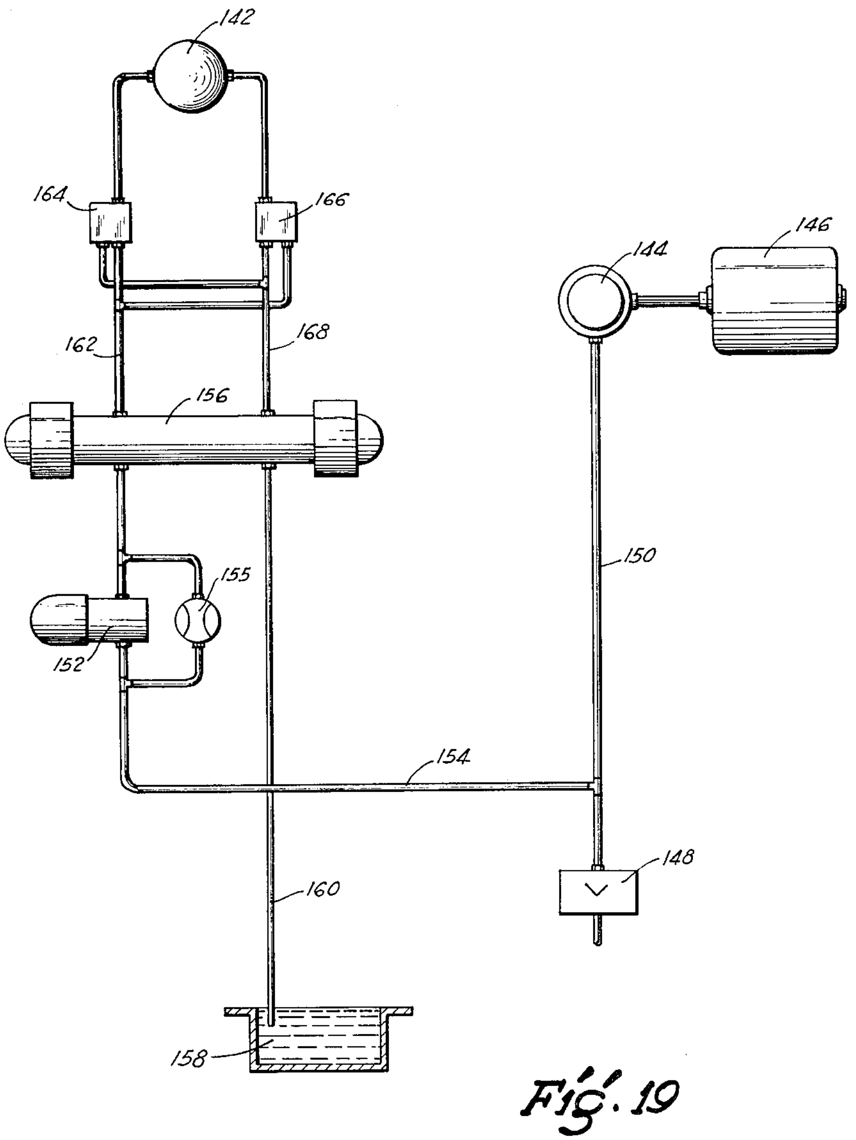
FIGURE 19 is a schematic diagram of the hydraulic circuit of the invention.

The rack 52 is propelled along the rails 54 by means of a rack member 138 (FIGURE 9) and a cooperating pinion or gear member 140. The rack member 138 is shown only in FIGURE 9, but extends longitudinally along one of the side angles 56 of the rack 52, and the gear 140 is rotated by a suitable hydraulic motor 142. The power for driving the rack 52 is provided by a hydraulic circuit which is depicted schematically in FIGURE 19. The hydraulic circuit comprises a pump 144 energized or actuated by a suitable electric motor 146, and connected with a pressure relief valve 148 through the pressure line 150. The valve 148 is also connected by a pressure line 154 through a normally open valve 152, which is paralleled by a metering orifice 155 to a four-way valve 156. The valve 156 normally has the input port thereof connected to the pressure tank 158 through the line 160. When the four-way valve 156 is energized in the forward position, the pressure in the line 162 opens the check valves 164 and 166 whereby the hydraulic fluid is admitted to the hydraulic motor 142, and the motor 142 is rotated in a forward direction, returning the pressure fluid back to the tank 158 through the four-way valve 156 and the line 160. When the slow speed valve 152 is energized, the pressure line 154 is connected to the four-way valve 156 only through the metering orifice 155, thus reducing the speed of the hydraulic motor 142, which in turn reduces the speed of rotation of the gear 140 and reduces the traveling speed of the rack 52. To reverse the motor 142, the reverse side of the valve 156 is energized whereby the pressure fluid in the line 168 opens the valves 164 and 166, thus rotating the motor 142 in reverse. In this manner, the rack 52 may be propelled along the rails 54 in a reverse direction. The check valves 164 and 166 provide the braking power by closing on the return of the four-way valve 156 to the neutral position by deenergizing either the forward or reverse side thereof.

The rack 52 is provided with a plurality of outwardly or downwardly extending lugs 170 (FIGURE 8) which are preferably spaced at one foot intervals therealong and may be conveniently secured to the cross members 58. The lugs 170 contact a pair of micro-switches for energization thereof to control the counting of the total feet traversed in order that the stopping of the rack 52 at the desired foot intervals during the punching operation will be accomplished, and as will be set out in detail in the electrical circuit.

Referring now to FIGURE 10, the workpiece 42 may be automatically ejected from the apparatus 10 upon the completion of the punching of the holes therein. A plurality of spaced ejector members, generally indicated at 172, are spaced along the work holder member 44 at the desired intervals wherein it is desired to eject the work piece. The ejector mechanism 172 preferably comprises an angled support member 174 secured to one of the leg beams 148 in any suitable manner, such as by welding, or the like. A plurality of spaced roller members 176 may be suitably mounted on the angled members 174, if desired, for supporting the workpiece 42 and facilitating the movement thereof during the punching operation. A plate member 178 is pivotally secured to the angled support member 174 by a suitable hinge member 180. A pair of complementary roller members 182 are carried by the plate or strap member 178 for supporting the work piece 42 in cooperation with the rollers 176. A longitudinally extending rod 184 extends throughout the length of the work support member 44 and parallel thereto, as shown in FIGURE 5, and is suitably journalled in the leg beams 149 for rotation, either manually or automatically. The leg beams 149 are disposed adjacent the legs 148, and are preferably similar thereto. The rod 184 is connected with a pin 186 by a link arm member 188, and the pin 186 is in turn connected with a pin 190 by a link arm member 192. The pin 190 is carried by the strap member 178 by an arm member 194. A plurality of spaced roller members 196 (shown only in FIGURE 10) are journalled on the upper end of the leg beams 149 and are so disposed that the plane of the upper surfaces thereof slopes downwardly and outwardly and a slight angle from the horizontal, as indicated by the line 198.

When the work piece 42 has been punched in accordance with the predetermined pattern, and it is desired to eject the piece 42 from the apparatus 10, the rod 184 is rotated, either in response to an automatic signal, or manually, as desired, whereby the pin 186 is rotated through an arc, as indicated by the line 200. The pin 186 transmits movement to the pin 190 by the link arm 192 whereby the pin 190 rotates through an arc as indicated by the line 202. This rotates the plate or strap 178 about the hinge 180 for dropping the rollers 182 away from the normal position adjacent the work piece 42. Upon the lowering of the rollers 182, the work piece 42 will drop whereby one leg thereof will be supported on the upper surface of the rollers 196. The downward and outward slope of the plane of the rollers 196 will permit the work piece to fall to the ground by gravity, and work piece after work piece may be so ejected from the apparatus 10. It is found that the work pieces 42 thus ejected will stack one upon another, particularly in the case of angles, thus facilitating the handling of the finished product.

Figure 4:
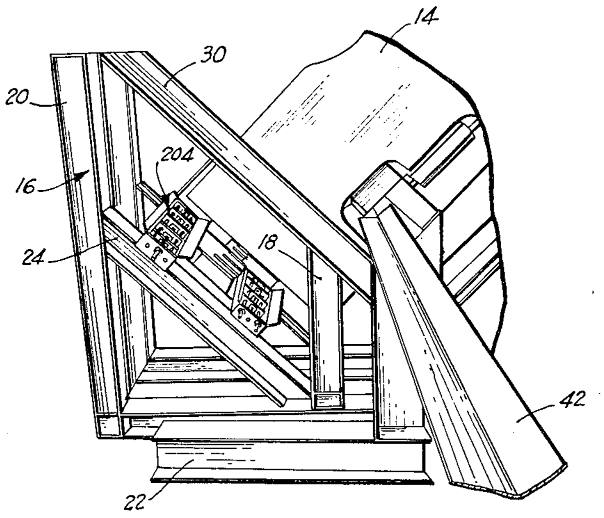
FIGURE 4 is a view similar to FIGURE 3 depicting a work piece disposed on the apparatus.

Each punch machine 12 and 14 is provided with an indexing mechanism 204, only one of which is depicted in FIGURE 4. The indexing mechanisms 204 are substantially identical to the indexing mechanism 60, and function in substantially the identical manner for controlling the sliding or reciprocal movement of the respective punch machine 12 and 14 along the respective guide rails 30 and 26 therefore. The only difference between the indexing mechanisms 204 and the indexing mechanism 60 is that there is no plunger, such as the plunger 108, since there is no need therefor. The indexing mechanisms 204 operate in response to electric signals for controlling the distance through which the respective punch machines 12 and 14 travel, thus controlling the gage of the hole to be punched in the work piece 42. The gage of the hole is considered to be the distance between the center line of the hole and the lower limit or outer limit of the work piece 42, as is well known. In the case of an angle member, the gage is the distance between the heel of the angle and the center line of the hole.

The indexing mechanisms 204 are not depicted in FIGURES 1, 2 and 30 for purposes of clarifying the illustration of the invention. The relatively complex nature of the over-all apparatus 10 lends itself to confusion without the elimination of certain portions in some of the general and more illustrative figures, as is well known.

*Mechanical operation*

When it is desired to punch the work piece 42 in accordance with a predetermined pattern or arrangement of holes, the apparatus 10 is energized by the electrical circuit, as will be hereinafter set forth. The rack 52 picks up or connects with the forward end of the work piece 42 by the hook member (not shown), and the rack 52 is propelled along the rails 54 in response to the electrical energization of the circuit in accordance with the predetermined program of the control means. Thus, the work piece 42 is advanced toward the punch machines 12 and 14 the proper distance, and stopped thereunder for being punched with the first holes of the desired pattern.

For purposes of illustration, assume the work piece 42 to be an angle member. One leg of the member 42 will be punched by the machine 12, whereas the other leg of the member 42 will be punched by the machine 14. When the electrical signal actuates the indexing mechanism 60 for stopping the forward movement of the rack 52 and work piece 42, the indexing mechanisms 204 are actuated in turn for sliding the respective punch machine toward the work piece 42 the preselected distance. The respective punch press 12 or 14 is thus positioned with respect to the work piece for punching the hole therein at the desired position. The electrical circuit then signals the respective punch machine for operation thereof to punch the hole in the work piece 42. Upon the completion of the punching of the first hole, the indexing mechanism 204 is actuated for returning the respective punch machine to the normal position out of contact with the work piece.

The indexing mechanism 60 is then energized for advancing the rack 52 sufficiently for positioning the work piece 42 with respect to the punch machines for receiving the next succeeding hole. Of course, if the next succeeding hole is to be in transverse alignment with the first hole, there will be no forward movement of the work piece 42. The rack 52 and work piece 42 are automatically stopped at the proper positions with respect to the punch machines, and the punching operation is repeated, as hereinbefore set forth. The entire operation is continued in accordance with the predetermined programming of the electrical circuit, to be hereinafter set forth, until the work piece has been properly punched. At the completion of the punching operation on a work piece, the rack member 52 is disengaged therefrom by releasing the hook member (not shown) from contact with the work piece, and the completed work piece may then be automatically ejected from the machine by the mechanism 172. After the perforated or punched work piece has been ejected from the apparatus 10, the rack 52 may be automatically returned to a position adjacent the punch machines 12 and 14 and engaged with the next succeeding work piece 42, and the same operation may be performed on the next succeeding work piece. Substantially any number of successive work pieces may be identically punched with great speed and accuracy.

*Electrical control system*

Figure 20:
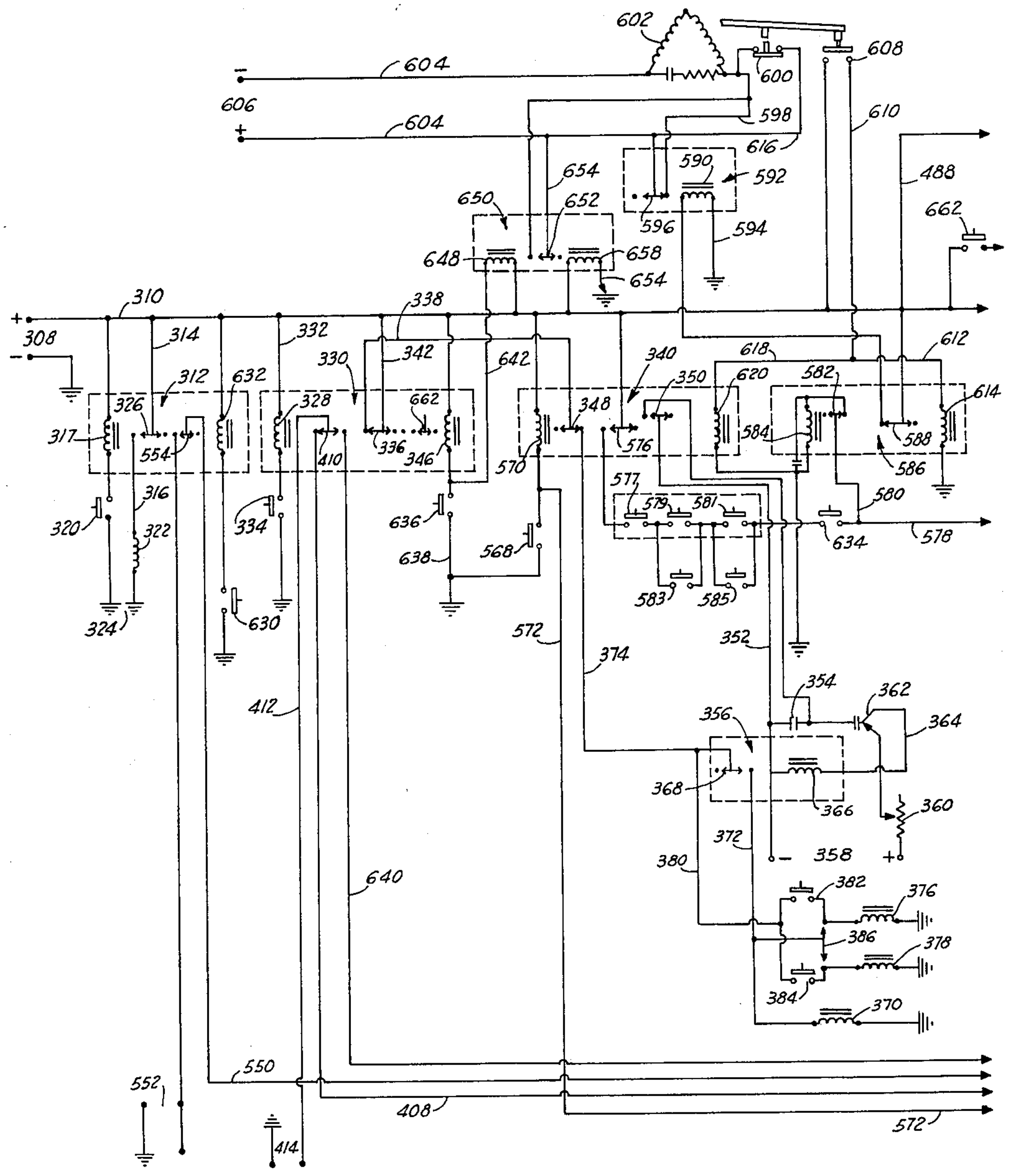
FIGURE 20 is a schematic view of the first portion of the electrical circuit diagram of an electrical control means for the apparatus.
Figure 21:
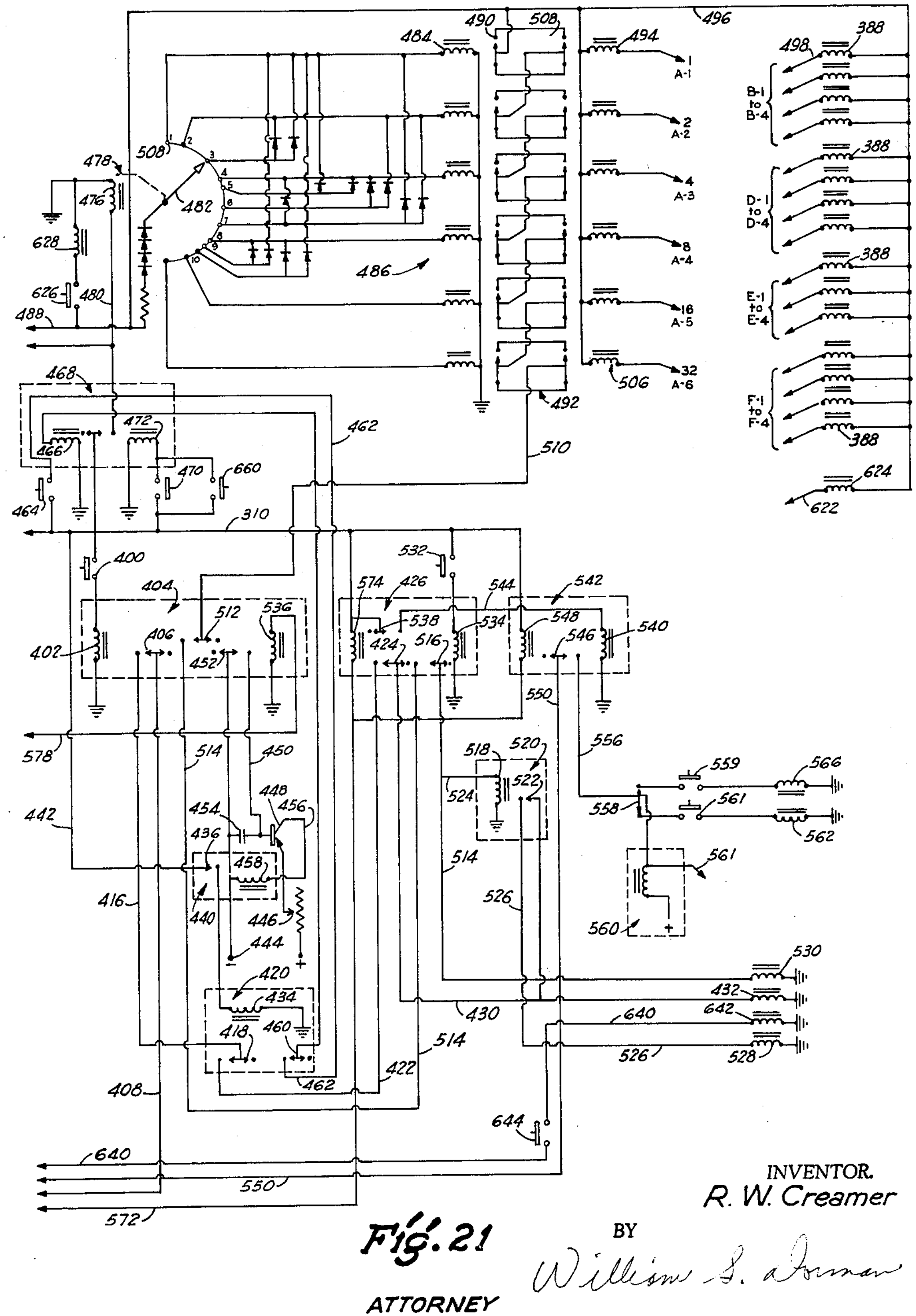
FIGURE 21 is a schematic view of the second portion of the electrical circuit diagram shown in FIGURE 20.

Referring now in detail to the schematic wiring diagrams of the automatic punch press apparatus 10, and particularly referring to FIGURES 20 and 21, the reference character 308 denotes a direct current constant voltage power supply which is preferably, but not limited to, supplying 110 volts of direct current. A clamp relay 312, for clamping the work piece 42 prior to being fed into the punch press apparatus 10, is connected to the main bus 310 of the power supply 308 by connectors 314. The clamp relay 312 may be any well known type in the art wherein the closing of one switch by an electrical means provides for the simultaneous opening of a mechanically connected switch. A common type of switch that is preferably used in this invention is a double pole double throw switch which utilizes a plurality of selectively energized solenoids to alternately operate circuit making or breaking devices.

The conductors 314 are connected through the left solenoid 317 of the relay 312 and conductors 316 to the manual switch 320 and the clamp solenoid 322. The clamping circuit may be completed to ground 324 so that upon closing of the normally open switch 320, the solenoid 317 is energized to draw the switch contacts 326 of the clamp relay 312 into a closed position thereby connecting the grounded clamp solenoid 322 to the main bus 310 through conductors 316 and 314. The energization of solenoids 322 causes the closing of the clamping members (not shown) of the rack mechanism 52 upon the end of the structural steel work piece 42 prior to the feeding thereof into the punch apparatus 10 for the punching operation.

The left solenoids 328 of a relay 330 are connected to the main bus 310 through a conductor 332 and through a manually operable starting switch 334 to ground. The closing of the normally open switch 334 energizes the solenoid 328 thereby drawing the switch contacts of relay 330 to the left and closing a plurality of circuits leading through the relay 330, as will be hereinafter set forth in greater detail. The actuation of the start button 334 is the first step of the subsequent sequencing operation and the initiating of the forward operating of the punching apparatus 10.

The energization of the solenoid 328 of relay 330 closes the switch contacts 336 to connect the conductor 338 from the relay 340 through conductor 342 to the main bus 310. Simultaneously therewith, the right solenoid 346 of relay 340 is energized to close the contacts 348 and open the contacts 350 of the relay 340. The contacts 350 are interposed in a conductor 352 which provides a by-pass path around a capacitor 354 arranged in a time delay circuit associated with relay 356. In normal operation, conductor 352 permits a current flow from a direct current source 358 through a variable resistor 360 and a suitable transistor 362. When the contacts 350 are opened, the current flows across the capacitor 354 until it is fully charged, then it is directed through lead 364 to the solenoid 366 of relay 356. The energization of relay solenoid 366 closes the contacts 368 of relay 356, thereby allowing the energization of solenoid 370 through conductors 372, 374, 338 and 342.

The indexing cylinders 74 and 76, which control the inches and fractional inches through which the rack moves with respect to the punching apparatus 10, are rotated to a predetermined position in accordance with a signal derived from a non-conducting perforated control tape 502 prior to the energization of the slide solenoid 370. Thus, when the slide solenoid 370 is energized, the slide draws one of the indexing members into contact with the other in order to set the inches and fractional inches portion of the total travel of the rack 52 for a specific punching operation by the punching apparatus 10. The feet portion of the rack travel is also controlled by the electrical system in that the point of moving the plunger 108 downwardly into the path of the transversely extending cross member 58 is precisely determined and the rack movement is halted at exactly the longitudinal position desired for the punching of the work piece 42 by the punching machines 12 and 14.

The closing of the switch 348 also energizes either of the machine extension solenoids 376 or 378 which control the positioning of the punch presses 12 and 14 through conductor 380. Similar to the positioning of the inch and fractional inch indexing members 74 and 76 by extension of the slide, the indexing member of the indexing apparatus 204, which control the inch and fractional inch movement of the punching machines 12 and 14 with respect to the gage of the work piece 42, are drawn together by closing of switch 386, as determined by which leg of the work piece is to be punched. Prior to the closing of the switch 386, the solenoids 388 (FIGURE 21) have been selectively energized to rotate the indexing members into a predetermined gage setting position so that when the indexing members are drawn together, the respective punching machine 12 or 14 will be exactly positioned with respect to a leg of the work piece 42 for precisely determining the gage of the hole to be punched in the work piece. A switch 386 connects either the left punching machine solenoid 376 or the right punching machine solenoid 378 to conductor 372. The position of switch 386 is determined by relay 560 which is controlled by the control tape 502 in a manner which will hereinafter be set forth in greater detail. Manually operated switches 382 and 384 are provided to respectively connect machine extension solenoids 376 and 378 through conductor 380 to the main bus 310. The manually operated switches 382 and 384 are used in the instances where the gage of the holes to be punched in the work piece are the same, or in other instances which dictate a manual setting of the punching machines 12 and 14. A plurality of manually operated switches (not shown) are provided to set the indexing cams for the rack travel and the gage of the holes in the work piece when the punching apparatus 10 is manually operated.

When the slide of the indexing mechanism 204 which is actuated by solenoid 370 is extended, the normally open micro-switch 400 is closed to energize the left portion 402 of relay 404. The closing of switch 400 connects the left solenoid 402 of the relay 404 from the main bus 310 to ground whereby the switch contacts 406 of relay 404 controlled by the solenoid 402 are drawn into a closed position. The contacts 406 of relay 404 are connected through a conductor 408 to a set of switch contacts 410 that are controlled by relay 330 and which were closed by the actuation of the start button 334 to start or initiate the forward sequence of operations. The contacts 410 connect the conductor 408 through conductor 412 to an alternating current power supply 414 having preferably a voltage of 110, although not limited specifically thereto. The closing of switch contacts 406 thus connects the alternating current power supply 414 through conductors 412 and 408 and 416 to contacts 418 of relay 420. The switch contacts 418, when closed, are connected by conductor 422, the closed switch contacts 424 of a relay 426, and a conductor 430 to a grounded hydraulic motor valve solenoid 432. The energization of the hydraulic motor valve solenoid 432 opens the hydraulic valve 156 to permit operation of the hydraulic motor 142 in a forward direction.

The solenoid 434 of relay 420 is energized by the closing of switch contacts 436 of relay 440 which connects the solenoid 434 to the main bus 310 through conductor 442. In an "at rest" position, a direct current source 444, of approximately 28 volts, flows through a variable resister 446, across a suitable transistor 448, and through a conductor 450 in which is interposed the movable switch contacts 452 of relay 404. The conductor 450 provides a by-pass path around a capacitor 454 that is connected from one side of the transistor 448 to the other side of the direct current source 444. The energization of the left solenoid 402 of relay 404 by the closing of switch 440 opens the switch contacts 452 and allows the capacitor 454 to charge. When the capacitor 454 is fully charged, the current is directed through the transistor 448 to a conductor 456 which connects the solenoid 458 of relay 440 across the direct current source 444. The variable resistor 446 is provided in order to vary the time from the initial opening of the switch contacts 452 of relay 404 to the energization of solenoid 434 and the closing the switch 436. The time delay circuit is provided to delay the actuation of the hydraulic motor solenoid 432 for a short period of time and allow the plunger 108 and the switch 400 to engage the foot indicating members 58 carried by the moving rack 52 if the measurement indicated by the control tape 502 so requires.

A second set of switch contacts 460 is also controlled by relay 420 so that prior to the energization of solenoid 434 and during the time delay period, as determined by the time delay circuit, the circuit 462 leading from switch 464 is positively opened and remains open until the time delay period is completed.

When the time delay period has ended and the solenoid 458 of relay 440 has caused relay 420 to close the switch contacts 418 to initiate starting of the hydraulic motor 142 in a forward direction, the switch contacts 460 of relay 420 are also closed. A circuit is then completed through switch 464, lead 462, switch contacts 460 and the left solenoid 466 of relay 468 to the main bus 310. A circuit also can be closed from the main bus 310 through the micro-switch 470 and the second coil 472 of relay 468 to ground. The solenoids 466 and 472 are respectively energized by the sequential closing of the micro-switches 464 and 470 by the lug members 170 positioned on the moving rack 52. The sequential energization of solenoids 466 and 472 of relay 468 repetitively close the switch contacts 474 thereby energizing the solenoid 476 of a stepping switch 478 through circuit 480.

The energization of the solenoid 476 of the stepping switch 478 causes the conductor arm 482 of the stepping switch 478 to move to a first conducting position and to connect the first solenoid 484 of the relay group 486 through circuit 488 to the main bus 310. The energization of solenoid 484 closes its respective switch contacts 490 of switch bank 492. Each of the solenoids 494 is connected through conductor 496 and 488 to the main bus 310 and has a conducting brush or conducting means 498 connected to its other end. The metal brush 498 is urged against the outer periphery of a conducting grounded drum 500 for completion of a circuit through each of the solenoids 494. The non-conducting control tape 502 is interposed between the brush 498 and the drum 500 for precluding contact of the brush with the drum except through selected apertures 504 which are provided in the tape 502 to provide for correct actuation of the relays and accurate punching of the work piece 42.

Figures 22, 23:
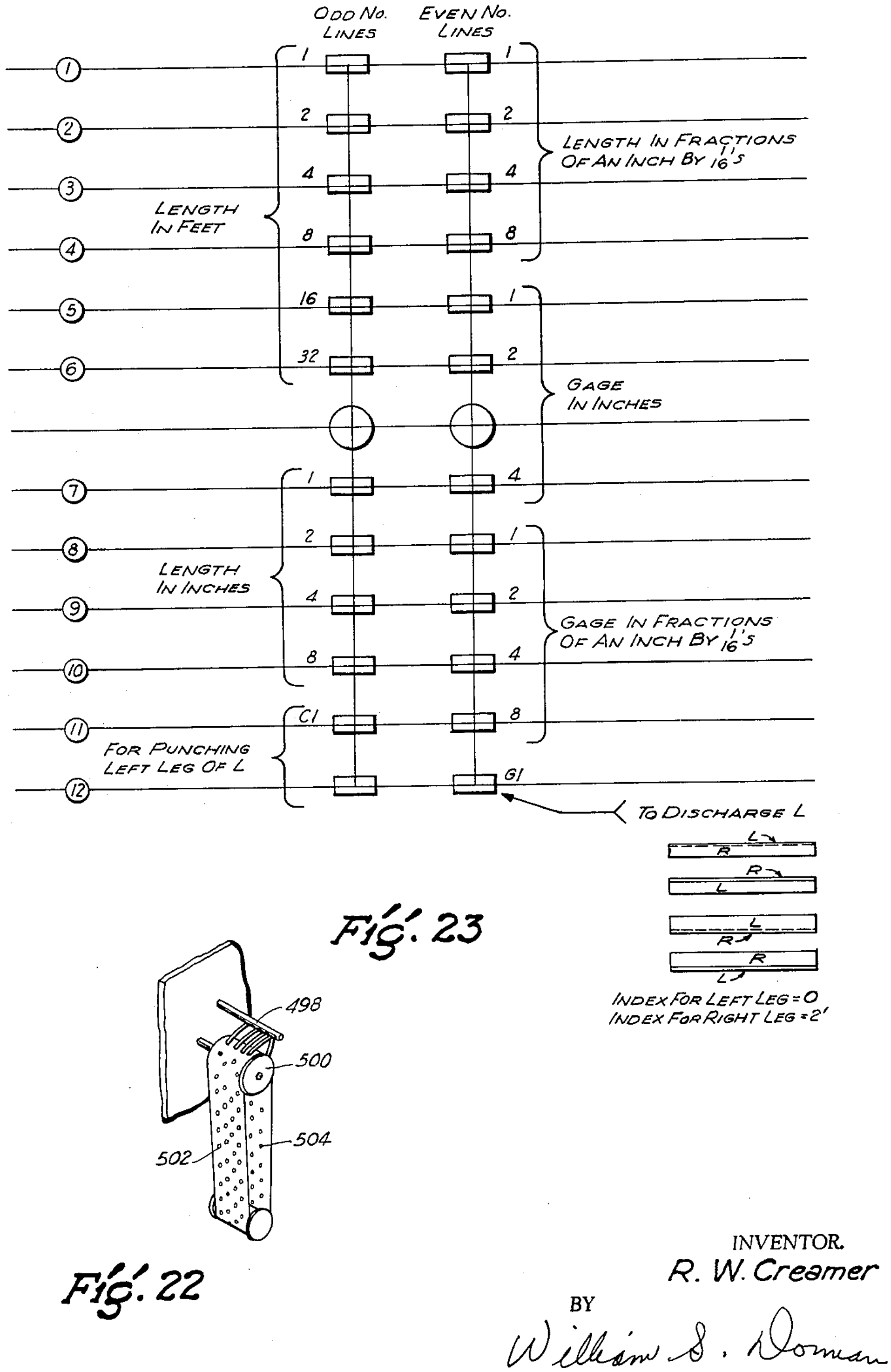
FIGURE 22 is a perspective view of a control tape means for the apparatus.
FIGURE 23 is a plan view of an illustrative control tape.

A plurality of solenoids 388 are connected to the conductor 496 and are individually connected to the conducting metal brushes 498. The brushes 498 are biased against the outer periphery of the grounded drum 500 and are precluded from coming into direct contact with the drum 500 except at predetermined points as defined by the perforations 504 in the non-conducting tape 502 which is interposed between the brushes and the drum. The energization of the solenoids 388 by contact of the brushes 498 with the grounded drum 500 through the perforations 504 in the control tape 502 causes the actuation of the pneumatic valves or cylinders 70 for movement of rod 72 and the rotation of the indexing members 74 and 76 to a predetermined position. More than one solenoid 388 may be energized at one time so that the total effect of the actuation of the pneumatic valves may be cumulative and a greater number of desired rotative positions of the indexing members may be obtained. It is to be understood that the exact means of actuating the indexing cylinders is not limited to that specifically shown, but it is well within the scope of the invention to provide any entirely electrical means for operating the indexing cylinder. FIGURE 23 illustrates a suitable control tape and the manner in which it may be punched for automatic control of the solenoids 388.

The relay group 506 controls the length of travel in feet of the rack 52 which is carrying the work piece 42 by the actuation of the clamping circuit, as hereinbefore set forth. The stepping switch 478 sweeps the arm 482 through the active control points 503, thereby energizing the solenoids 484 both singly and cumulatively in order to count up to the desired number until the switch contacts 490 of the switch bank 492 are closed. At the desired number of feet of travel of the rack 52, a brush 498 connected to a solenoid 494 passes through one of the apertures 504 in the control tape 502 to contact the grounded drum 500 and close the right contacts 508 of the switch bank 492, thereby completing a circuit therethrough. A conductor 510 connects the switch bank 492 to the switch contacts 512 of relay 404 that were closed by the energization of solenoid 402 of relay 404 by the closing of microswitch 400. The circuit continues from contacts 512, through conductor 514 to the closed contacts 516 of relay 426. The solenoid 518 of relay 520 then closes contacts 522 after being energized by connection of lead 524 to conductor 514 after it passes the switch contacts 516. One side of the contacts 522 is connected to the energized lead 430 and the other side is connected through conductor 526 to the solenoid 528, which actuates the hydraulic motor valve 156 that slows the motor 142 and in turn reduces the rate of travel of the rack 52.

The energized lead 514, which is energized from the main bus 310, then completes a circuit through solenoid 530 which actuates the plunger 108 downwardly. As set forth in the mechanical description, a plurality of transversely extending members 58 are carried by the rack 52 and are so positioned to correspond to the foot lengths of the rack. As previously set forth, the apertures appearing in the control tape 502 determine the point at which the plunger 108 is lowered and the rack 52 is halted. The downward movement of the plunger 108 brings it into the path of the foot members 58 of the moving rack for halting the movement thereof. When the predetermined foot member 58 contacts the plunger 108, the micro-switch 532 carried by the plunger mechanism is closed to complete the circuit from the main bus 310 through the right solenoid 534 of relay 426 to ground.

The energization of the right coil 536 of relay 404 opens the controlled switch contacts 406 and 452 of relay 404 thereby de-energizing the solenoids 432 and 528 to stop the forward movement of the rack 52 and de-energizing solenoid 530 to retract the plunger 108 from its downwardly extended position.

The energization of the right side of relay 404 also closes the switch contacts 538 to energize the right coil 540 of relay 542 through lead 544 to the main bus 310. The energization of coil 540 closes the switch contacts 546 of relay 542. The left solenoid 548 is connected to the bus 310 to maintain contacts 546 in a normally open position. A conductor 550 connects the contacts 546 to an alternating current source 552 through contacts 554 of relay 312, which were closed by the energization of coil 317 by the clamp button 320. A lead 556 connects the switch 546 to the switch 558 which is movable between two circuit closing positions. The relay 560 has a contact arm 561 which rides upon the outer periphery of the grounded control drum 500 in a manner similar to contact arms 498 and that permits control of the relay by the control tape 502 in an identical fashion. The switch 558 is normally thrown to a lower position, designated the right, for energization of the punch solenoid 562 for punching of the right leg of the work piece 42. The contact of the brush 561 with one of the apertures 504 in the control tape 502 allows an electrical circuit to be completed through the solenoid 564, the relay 560, and the switch 558 to be drawn to its other circuit closing position, thereby allowing the left machine trip solenoid 566 of the punching apparatus or machine 12 or 14 to be actuated.

Prior to the energization of either trip solenoid 562 or 566 of the punching machines 12 or 14, either switch 559 or switch 561 is closed by the extension of the punching machines by energization of solenoid 376 or 378. Thus, when switch 558 is closed to energize one of the punching machine solenoids, a circuit may be completed through either switch 559 or 561 and its respective solenoid to ground. It can be seen that the closing of switch contacts 546 by solenoid 542 allows either the punch trip solenoid 562 or 566, as determined by relay 560, to be energized for the operation of the punch on the work piece 42.

The actuation of the punch by either solenoid 562 or 566 closes the micro-switch 568 (FIGURE 20) and energizes the reset solenoid 570 of relay 340. The energization of the left solenoid 570 of relay 340 open switch contacts 348 to interrupt the circuit energizing the machine extension solenoids 376 and 378. Thus, the de-energization of the solenoids 376 and 378 permits the slide to retract and the machines 12 and 14 to retract to a ready position. The closing of micro-switch 568 by the actuation of the punch also completes a circuit from the main bus 310 to ground through conductor 572 thereby energizing the left solenoid 514 of the plunger relay 426. The energization of solenoid 574 opens contacts 538 to de-energize the coil 540 of the machine trip relay 542. The solenoid 574 also recloses contacts 524 and 516 of relay 426 to their normally closed position and readies the system for another cycle.

The energization of the reset solenoid 570 of the relay 340 closes switch contacts 576 to complete a circuit through conductor 578 to energize the right coil 536 of motor control relay 404. The right coil 536 of the motor control 404 opens the switch contacts 406 and 512 and closes the switch contacts 452 for a complete resetting of relay 404. The closing of switch contacts 452 completes the by-pass path around capacitor 454 provided by conductor 450 thereby precluding use of the time delay circuit by the energization of solenoid 458. A plurality of micro-switches 577, 579 and 581 are interposed in conductor 578 and are required to be in their closed positions for correct operation of the punching apparatus 10 when it is under the control of the automatic tape control means. The switch 577 is closed by the slide member when it is extended to its fully open position by energization of the slide extension solenoid 370. The switch 579 is closed when the right punching machine, such as machine 12, has been fully retracted to its normally inoperative position. The switch 581 is similarly closed when the left punching machine, such as machine 14, has been retracted to its normal raised position. A micro-switch 583, a companion switch of manual switch 382, is placed in parallel with 579. The closing of switch 382 also closes switch 579 so that when the punching machine 12 is being manually operated and being held in an extended position for punching a subsequent hole, the tape drive for the control tape may be actuated and the signal for punching a subsequent hole may be given. If this were not so, the switch 579 would remain open while the punching machine is extended and preclude signalling of the following punching operations. Similarly, switch 585, a companion switch of switch 384 and closed simultaneously therewith, is connected in parallel with switch 581 for an identical purpose.

The closing of switch contacts 576 of relay 340 also allows current to pass through conductor 580, closed switch contacts 582, and the left solenoid 584 of relay 586 to ground. The energization of the solenoid 584 then causes the contact 582 to be opened and the solenoid 584 de-energized. Simultaneously with the opening of switch contacts 582, the contacts 588 are closed, thereby connecting the solenoid 590 of relay 592 from the main bus 310 through conductor 594 to ground.

The closing of switch contacts 588 thus energizes the solenoid 590 and causes the closing of contacts 596 of the relay 592. The closing of contacts 596, which are interposed in conductor 598, momentarily shorts the normally closed switch 600 that is controlled by a cam rotated by a suitable electric motor 602 and which is in an open position at the time of the energization of relay 592. The closing of contacts 596 completes a circuit through conductors 604 and 598 to an alternating current power source 606 for the energization of the electric motor 602 which provides the drive for the non-conducting control tape 502 for operation through one revolution. When the motor 602 has rotated its shaft through a predetermined angle which is preferably two hundred and seventy degrees, although not specifically limited thereto, a cam positioned on the motor shaft closes switch 608 which connects the conductor 610 from the main bus 310 to the conductor 612 and then to ground. The flow of current through conductor 612 energizes the right solenoid 614 of the relay 586. The energization of solenoid 614 by the closing of contacts 608 causes the contacts 588 controlled by solenoid 614 to be opened and the tape advance relay 592 to be de-energized.

As soon as the shaft of motor 602 begins to turn, due to the closing of contacts 596, a lobe on a cam carried thereby moves away from the position wherein the switch 600 was being held open. Thus, when the conductor 598 shorting out the switch 600 was opened the switch 600 was then in a closed position and with conductor 616 permitted the leads 604 to continue to energize the motor 602. When the shaft of the motor 602 has been rotated through one complete revolution, or three hundred and sixty degrees, the lobe hereinbefore mentioned opens the switch 600 and de-energizes the motor 602 and the tape drive thereby stopping the movement of the tape 502 and positioning it for operation through another cycle.

The closing of micro-switch 608 also connects conductor 610 from ground through lead 618 to the main bus 310. The flow of current through lead 618 energizes the solenoid 620 of relay 340 and causes the contacts 350 controlled thereby to open. The opening of contacts 350 opens the by-pass conductor 352 around the capacitor 354 of the time delay relay 356 for resetting thereof. After completion of the predetermined time delay period, the solenoid 366 of relay 356 is energized and the contacts 368 of the relay 356 are closed for energization of the machine extension solenoids 376 and 378 and the solenoid 370 for extending the slide of the indexing mechanism 204. Then the cycle continues to repeat until the punched perforations on the control tape have ended or moved through a complete cycle and the punching operation has ended.

After the punching operations on the work piece 42 have been completed, the tape control brush 622 (FIGURE 21) riding on the non-conducting control tape 502 passes through a predetermined aperture in the tape, at a point following the punching control apertures, to contact the grounded tape drum 500. The touching of the grounded drum by the brush 622 energizes solenoid 624 through the conductor 496 to the main bus 310. The energization of solenoid 624 causes the contacts 626 to close and to energize the coil 628, a component solenoid of the stepping switch 478. The energization of solenoid 628 biases the switch 630 (FIGURE 20) toward a closed position. At the end of the travel of the rack 52 for a predetermined distance, the switch 630 is allowed to fully close and to energize the right solenoid 632 of relay 312. The energization of solenoid 632 opens the contacts 326 of relay 312 to open the clamp circuit, thereby actuating the clamping mechanism to release the work piece 42 so that it may be removed from the punching apparatus 10 and another work piece readied for being punched. The solenoid 632 also opens the contacts 554 and disconnects the conductor 550 leading to the alternating current source. The solenoid 632 also acts to open switch 634 which is interposed in conductor 578 thereby opening the circuit leading to the right solenoid 472 of relay 468.

The manual closing of switch 636 by the operator of the punching apparatus 10 completes a circuit from the main bus 310 to ground through the conductor 638 and the right or reversing solenoid 346 of relay 330. The energization of the reversing solenoid 346 causes the contacts 336 of relay 330 to open, thereby disconnecting conductors 338 and 342 and precluding the flow of current through one circuit leading to relay 340. The solenoid 346 also closes contacts 410 to connect the lead 412 from the alternating current source 414 to conductor 640, thereby energizing the solenoid 642 which acts to reverse the operation of the hydraulic motor 142 and to return the rack 52 to its original or ready position.

A normally closed limit switch 644 is interposed in conductor 642 and is actuated by the rack, when it has returned to a zero or ready position, to open the conductor 640 and de-energize the hydraulic motor reversing solenoid 642.

The closing of the reversing switch 636 also closes a circuit through conductor 646 thereby energizing the left or reset tape resetting solenoid 648 of relay 650. The energization of the left solenoid 648 of relay 650 closes the contacts 652 of relay 650. The closing of the contacts 652 connects conductor 598 to conductor 604 through lead 654 thereby allowing contacts 652 to assume control of the motor 602 by shorting out switch 600. Thus, the motor 602 is energized and continues to run until the tape 502 has been advanced to a point where the conducting brush 656 passes through a predetermined aperture in the tape 502 and contacts the grounded drum 500. The contact of the brush 656 with the drum 500 completes a circuit through the right solenoid 658 of the relay 650. The energizing of the solenoid 658 of relay 650 opens the contacts 652 thereby opening conductor 654 and again allowing switch 600 and related mechanism to assume control of the tape drive motor 602, which is then automatically opened by the cam at the ready position of the control tape waiting for another work piece to be positioned in the punching apparatus 10 for operation thereon.

When the rack 52 reaches the starting or zero feet position, a member carried by the rack closes switch 660 to energize the right solenoid 472 of relay 468. The energization of solenoid 472 causes the contacts 474 of relay 468 to close and thereby ready relay 468 for operation of the stepping switch 478 when the cycle is repeated.

The switch contacts 662 of relay 330 are also closed when the reverse or right solenoid 346 is energized. In the closed position, the contacts 662 energize the stepping switch solenoid 476 for return to the zero setting point.

*Summary*

By way of summary, the work piece 42 is advanced along the work holder apparatus 40 by the movable rack member 52. The forward movement of the rack member 52 is controlled by the hydraulic circuit whereby the movement of the rack is initiated in response to signals from the control means. The rack indexing mechanism 60 is activated by the control means, and determines the forward distance through which the rack is moved, thus positioning the work piece 42 with respect to the punch machines 12 and 14 in accordance with the predetermined program or pattern of the control means. After the rack 52 has advanced the work piece 42 to the proper position on the work holder apparatus 40, the control means activates the punching machines 12 and 14 whereby the holes may be punched in the work piece. The punch machine indexing mechanism 204 is activated in response to a signal from the control means, and determines the distance through which the punch machines move, thus positioning the machines with respect to the work piece 42 in accordance with the desired gage or position of the hole to be punched. The entire operation is repeated as necessary to provide the desired pattern or arrangement of holes in the work piece 42, and the punched or perforated work piece is then ejected from the apparatus 10 in order that the operation may be repeated on another work piece.

As hereinbefore set forth, the invention is not limited to the punching of holes in a work piece, but may be utilized in accomplishing substantially any desired operation on the work piece. For example, the selection of spacing for drilling, bending, cutting, scoring, welding or the like, on the work piece may be automatically provided in the same manner as in the detailed description for the perforating process. It is anticipated that any operation may be effected on a work piece wherein it is desirable to select the disposition or positioning thereof in accordance with a pre-selected programming. Of course, in the instances of other operations than the punching or perforating of the work piece, it is desirable to utilize an appropriate machine for the desired operation in lieu of the punching machines depicted herein. The over-all method and apparatus, however, may be utilized in the scope of the invention to include many operations.

From the foregoing, it will be apparent that the present invention provides a novel automatic punch press apparatus wherein a plurality of work pieces may be punched in accordance with a predetermined pattern as programmed in a remotely disposed control mechanism. The work pieces or structure may be punched rapidly and with great accuracy. In addition, the control tape of the control means may be utilized intermittently with other control tapes wherein additional patterns may be programmed, and each time a particular control tape is utilized, the resulting perforated work piece will be accurately punched in accordance with those work pieces previously punched. The novel automatic punching apparatus provides a rapid and accurate means for punching structural members in an efficient and economical manner.

Whereas, the present invention has been described in particular relation to the drawings attached hereto, it should be remembered that other and further modifications, apart from those shown or suggested herein, may be made within the spirit and scope of this invention.

What is claimed is:

1. An automatic punch press apparatus comprising a framework structure for supporting a plurality of punch machines, a work holder structure extending through the framework structure for supporting a work piece, an intermittently movable control tape mechanically independent of said work piece and having a plurality of apertured positions spaced along said tape, a sensing means associated with said tape for energizing relays in accordance with the number and location of the apertures at a given position of said control tape, means for moving said tape so as to align a first apertured position thereof with said sensing means, means responsive to the actuation of certain relays by certain apertures at the first apertured position of said tape for advancing the work piece along the work holder structure, indexing means actuated by the advancement of the work piece for limiting the forward movement of the work piece with respect to the punch machines, means responsive to the actuation of certain other relays by certain other apertures at the first apertured position of said tape for positioning the punch machines with respect to the work piece for punching thereof, indexing means for controlling the positioning of the punch machines with respect to the work pieces in accordance with a predetermined position for the holes to be punched, and means responsive to the completion of the operations called for at said first position of said tape for advancing said tape to its next position with respect to said sensing means.

2. An automatic punch press apparatus comprising a plurality of punch machines, a framework structure, track means provided on the framework structure for reciprocally supporting the punching machines, work holder support means extending through the framework for slidably supporting a work piece, an intermittently movable control tape mechanically independent of said work piece and having a plurality of apertured positions spaced along said tape, a sensing means associated with said tape for energizing relays in accordance with the number and location of the apertures at a given position of said control tape, means for moving said tape so as to align a first apertured position thereof with said sensing means, means responsive to the actuation of certain relays by certain apertures at the first apertured position of said tape for advancing the work piece on the work holder support means, means actuated by the advancement of the work piece for controlling the advancement of the work piece in response to a predetermined program, means responsive to the actuation of certain other relays by certain other apertures at the first apertured position of said tape for reciprocating the punch machines on the track means in response to a predetermined program for punching holes in the work piece, means responsive to the completion of the operations called for at said first position of said tape for advancing said tape to its next position with respect to said sensing means and means responsive to the completion of all of the punching operations on said work piece for ejecting the punched work piece from the apparatus.

3. An automatic punch press apparatus comprising a plurality of punch machines, track means provided for reciprocally supporting the punch machines, said track means angularly disposed for facilitating the reciprocation of the punch machines, work holder means extending in the proximity of the punch machines for supporting a work piece, an intermittently movable control tape mechanically independent of said work piece and having a plurality of apertured positions spaced along said tape, a sensing means associated with said tape for energizing relays in accordance with the number and location of the apertures at a given position of said control tape, means for moving said tape so as to align a first apertured position thereof with said sensing means, means responsive to the actuation of certain relays by certain apertures at the first apertured position of said tape for moving the work piece in one direction along the work holder means, means actuated by the advancement of the work piece for controlling the movement of the work piece in the said one direction in predetermined intermittent increments of distance, means for reciprocating the punch machines on the track means, means responsive to the actuation of certain other relays by certain other apertures at the first apertured position of said tape for controlling the movement of the punch machines in one direction through a predetermined distance, means for automatically actuating the punch machines for punching the work piece in a predetermined location, means responsive to the completion of the operations called for at said first position of said tape for advancing said tape to its next position with respect to said sensing means and means responsive to the completion of all of the punching operations on said work piece for ejecting the punched work piece from the apparatus.

4. An automatic punch press apparatus comprising a support structure for supporting a pair of oppositely disposed punch machines, track means provided on the support structure for reciprocally supporting the punch machines, work holder means extending through the support structure for slidably supporting a work piece, an intermittently movable control tape mechanically independent of said work piece and having a plurality of apertured positions spaced along said tape, a sensing means associated with said tape for energizing relays in accordance with the number and location of the apertures at a given position of said control tape, means for moving said tape so as to align a first apertured position thereof with said sensing means, movable rack means extending in one direction from the punch machines responsive to the actuation of certain relays by certain apertures at the first apertured position of said tape for advancing the work piece in one direction along the work holder means, indexing means responsive to the actuation of certain other relays by certain other apertures at the first apertured position of said tape provided for limiting the movement of the punch machines in one direction on the track means, means for activating the punch machines for perforating the work piece, indexing means actuated by the advancement of the work piece provided for limiting the movement of the rack means in one direction in accordance with peredetermined dimensions, and means responsive to the completion of the operations called for at said first position of said tape for advancing said tape to its next position with respect to said sensing means.

5. An apparatus for automatically punching a predetermined pattern of apertures in a work piece and comprising punching means responsive to signals from a control means for intermittently punching the work piece, means for moving the work piece through the apparatus in response to signals from the control means, indexing means responsive to signals from the control means for limiting the movement of the work piece moving means in one direction in accordance with a predetermined program, and means for ejecting the perforated work piece subsequent to the punching operation, said control means comprising a plurality of relays that are energized in accordance with a plurality of predetermined apertures in a control tape whereby the indexing means, the work piece moving means, and the punching means may be correctly actuated for an accurate punching of the work piece.

6. An apparatus for automatically punching a predetermined pattern of apertures in a work piece and comprising punching means responsive to signals from a control means for intermittently punching the work piece, first indexing means for controlling the positioning of the punching means with respect to the work piece, means for moving the work piece through the apparatus in response to signals from the control means, and second indexing means responsive to signals from the control means for limiting the movement of the work piece moving means in one direction in accordance with a predetermined program, said control means comprising a plurality of relays for actuating the first indexing means, a plurality of relays for actuating the second indexing means, and a plurality of relays for actuating the rack moving means and the punching means, an intermittently driven control tape having apertures therein corresponding to the positions to which the rack moving means and the punching means are moved, and means associated with the control tape and adapted to complete an electrical circuit through said apertures for selectively energizing the aforesaid relays.

7. An apparatus for automatically punching a plurality of apertures in a work piece in accordance with a predetermined pattern, and comprising punching means for perforating the work piece, indexing means for controlling the positioning of the punching means with respect to the work piece for the perforating operation, means for automatically moving the work piece with respect to the punching means whereby the work piece may be perforated in accordance with the predetermined pattern, indexing means for limiting the movement of the work piece moving means in one direction, and control means for providing energization of the apparatus whereby the entire operation thereof is automatic in response to the predetermined pattern as programmed in the control means; said control means comprising a plurality of relays for actuating the indexing means, a plurality of relays for actuating the work piece moving means, an intermittently driven control tape having apertures therein corresponding to the positions to which the work piece moving means and the punching means are moved, contact means yieldingly engaging the control tape and adapted to complete an electrical circuit through said apertures for selectively energizing the aforesaid relays, the contact means also completing circuits through the control tape for halting movement of the work piece and for actuation of the punching machines in the aperture punching operation.

8. An apparatus for automatically punching a plurality of holes in a work piece in accordance with a predetermined pattern and comprising punching means for perforating the work piece, indexing means for controlling the positioning of the punching means with respect to the work piece for the perforating operation, means for automatically moving the work piece with respect to the punching means whereby the work piece may be perforated in accordance with the predetermined pattern, indexing means for limiting the movement of the work piece moving means in one direction, means for ejecting the perforated work piece from the apparatus subsequent to the punching operation, control means for providing energization of the apparatus whereby the entire operation thereof is automatic in response to the predetermined pattern as programmed in the control means; the control means comprising a plurality of relays for actuating the indexing means, a plurality of relays for controlling the movement of the work piece moving means, a plurality of relays for controlling the positioning and operation of the punching means, an intermittently driven control tape for determining the selective energization of the aforesaid relays.

9. An automatic punch press apparatus comprising a framework structure for supporting a plurality of punch machines, a work holder structure extending through the framework structure for supporting a work piece, means for advancing the work piece along the work holder structure, indexing means for limiting the forward movement of the work piece with respect to the punch machines, means for positioning the punch machines with respect to the work piece for punching thereof, indexing means for controlling the positioning of the punch machines with respect to the work piece in accordance with a predetermined position for the holes to be punched, control means for activating the apparatus in accordance with a predetermined programming for the pattern of the holes to be punched; said control means comprising an intermittently driven control tape having apertures therein corresponding to the positions to which the work piece advancing means and the punching machines are moved, contact means yieldingly engaging the control tape for completing electrical circuits through the apertures, said electrical circuits energizing means for the movement of the work piece advancing means and the positioning and actuation of the punching machines.

References Cited by the Examiner

UNITED STATES PATENTS

| | | | |
|---|---|---|---|
| 1,241,260 | 9/1917 | Wurts | 83—71 |
| 2,395,518 | 2/1946 | Svenson | 77—32.2 X |
| 3,090,261 | 5/1963 | Hill | 77—32.2 |
| 3,094,028 | 6/1963 | Ausenda | 83—71 |

WILLIAM W. DYER, Jr., *Primary Examiner.*

ANDREW R. JUHASZ, *Examiner.*